(12) United States Patent
Clune

(10) Patent No.: US 6,293,588 B1
(45) Date of Patent: Sep. 25, 2001

(54) SAFETY ENHANCED CENTER UNBUCKLING RESTRAINT EQUIPMENT (SECURE)

(76) Inventor: Elmer F. Clune, 29 Broadmoor Dr., Tonawanda, NY (US) 14150-5531

( * ) Notice: Subject to any disclaimer, the term of this patent is extended or adjusted under 35 U.S.C. 154(b) by 0 days.

(21) Appl. No.: 09/412,107

(22) Filed: Oct. 4, 1999

Related U.S. Application Data

(63) Continuation-in-part of application No. 09/153,012, filed on Sep. 14, 1998, now abandoned, and a continuation-in-part of application No. 09/036,905, filed on Mar. 9, 1998, now abandoned.

(51) Int. Cl.⁷ .................................................. B60R 22/03
(52) U.S. Cl. .......................... 280/808; 180/268; 180/270; 280/801.1; 280/751; 280/752; 280/805; 280/806; 280/807; 297/483; 297/484
(58) Field of Search ................................ 280/801.1, 806, 280/808, 807, 751, 752, 753, 805; 180/268, 270; 297/470, 474, 476, 477, 480, 481, 483, 484; 244/122 R, 122 AG, 122 B

(56) References Cited

U.S. PATENT DOCUMENTS

| | | | |
|---|---|---|---|
| 2,825,581 | 3/1958 | Knight | 280/150 |
| 3,321,246 | 5/1967 | Davies | 297/389 |
| 3,620,569 | 11/1971 | Mathis | 297/388 |
| 3,887,233 | 6/1975 | Garavaglia et al. | 297/389 |
| 4,321,987 | 3/1982 | Heideman et al. | 188/285 |
| 4,919,488 | 4/1990 | Deegener et al. | 297/468 |
| 5,050,712 | 9/1991 | Heideman | 188/287 |
| 5,159,997 | 11/1992 | Heideman | 188/282 |

*Primary Examiner*—Eric Culbreth

(57) ABSTRACT

An advanced automobile passenger restraint and deceleration system is defined, the design of which is centered on retractible belts comprised of a unique, two-part combination of a single lap belt and dual shoulder belt restraints with the lap belt retractors automatically electrically locking upon application of restraint for firmly-located, tension-free lap belt comfort. This belt system features a padded body-centered, abdominal-force-distributing and fastening plate consisting of two halves, each half being attached to one shoulder belt and to one half of the lap belt with the two halves snapping together to apply said belt restraint system with one simple manual action.

Further total restraint system enhancements are also included, with limited-releasing, energy-absorbing features added to a basic restraint along with further independent, padded, energy-absorbing capturing and restraining devices located to the fore of the automobile passenger which provide a potential for halving the deceleration forces suffered by a passenger in all minimum to maximum crashes.

Finally, a proffering feature is included which automatically applies the restraint system loosely about the passenger's body, the passenger completing firm, final application by snapping together said proffered fastener halves.

7 Claims, 13 Drawing Sheets

SAFETY ENHANCED CENTER UNBUCKLING RESTRAINT EQUIPMENT (SECURE)

The descriptive text and claims of this application are a 2nd continuation in part of an initial filing with a Filing Receipt Application No. of Ser. No. 09/036,905, dated Mar. 9, 1998, now abandoned, with a 1st continuation in part of Filing Receipt No. of Ser. No. 09/153, 012 of filing date of Sep. 14, 1998, now also abandoned. The subject second continuation in part includes all of the features claimed in the original patent application and its 1st continuation in part, which defined a new system design invention utilizing well known components or component technology, plus a proffering system that has now been added to greatly encourage/induce and ease application of the SECURE seat belt system by the auto passenger. In brief, the proffering system functions to loosely apply the belt restraint system automatically upon the auto passenger, and to not complete final application, would result in very inconvenient encumbrance upon the passenger, thus almost assuring final belt application by said passenger.

BACKGROUND OF INVENTION

The present invention relates to a new continuously-deployed passenger restraint system for passenger-carrying vehicles in unique forms with energy-absorbing features. Many patents for both three and four-point vehicle frame-mounted or a combination of vehicle door and frame mounted safety belt systems exist. However, prior construction fails in one way or another to provide a system that will, 1. hold the passenger in a force-distributed gentle manner to reduce or eliminate abdominal injury to a vehicle passenger caused by typical narrow belts that are especially inadequate for restraining pregnant women in high speed crashes,
2. also hold the passenger in a direction substantially off of the main line of a head-on vehicle crash as well as on the main line of the crash,
3. hold the passenger in a manner so as to prevent a torsional force on the upper body torso about the spinal axis of the vehicle passenger,
4. provide restraint for any passenger, over age of four, equally well with especial effectiveness for restraint of pregnant women,
5. cause no extra danger to an unbelted passenger as is the case for the air-bag-equipped car where any out of position passenger, such as caused by heavy braking or the like, can be seriously injured or killed,
6. provide an ideal, automatically-adjusted, firm-fitting application of the belt system onto the passenger's body with one simple manual fastening action,
7. provide an assistance or proffering feature to ease and induce application of the safety belt system by the passenger.

Three-point frame-mounted, or a combination of frame and door-mounted, passive restraint seat belts are in universal use in present day passenger-carrying vehicles. Because of their obvious inadequate upper-body restraining capability, they have not proven to be totally effective, and thus they are now being supplemented by Supplemental Inflatable Restraint(SIR) devices commonly called the "air bag". Since the air bag is an active, explosively-deployed device, with many inherent dangers to the more physically vulnerable, such as children, shorter, older or pregnant adults, as experience has clearly shown, a more fully effective, alternate or complimentary manual restraint system is highly desirable.

Patents have been issued over the past four decades for safety belt system designs intended to improve the upper-body restraint effectiveness over that provided by the three-point-mounted safety belt design now in universal use. All patent designs, for improved restraint systems examined, feature dual shoulder straps but lack the facility for easy application and lack full features to allow application of the belt system in a snug and fixed adjustment to the vehicle passenger's upper and lower torso.

U.S. Pat. No. 2,825,581 provides for automatic adjustment employing four spring-retracted reels, each of said retracting reels operating independently on an individual shoulder belt, of two, and on each half of a two-part lap belt, said lap belt being equipped with a center-fastening buckle. The basic deficiency of this concept is that the shoulder belts are not affixed to the lap belt in an abdominal-centered area to, 1. keep the shoulder belts properly in place and 2. to better help support the abdominal and chest area. The design of U.S. Pat. No. 3,321,246 overcomes this deficiency to some extent by using a continuous left half and a right half combination shoulder and lap belt. Each half of a two-piece center buckle rides loosely on one of each of the two belts but such arrangement does not provide for a securing of the center buckle along the belts, nor does it provide for a comfortable and adequate abdominal force-bearing surface.

The design of U.S. Pat. No. 3,620,569 overcomes the deficiencies of U.S. Pat. No. 3,321,246 by permanently securing each half of the centered application buckle to the shoulder/lap belts by short straps. However it employs two lower spring-loaded retractor reels with stronger springs than those used in the two upper shoulder belt retractors which, it is claimed, will hold the lap belt snug to the passenger's lap. Since this system contests one spring against another, the lap belt cannot be pulled completely snug upon the passenger's lap. More importantly, the two lower reel retracting springs must be identical in strength to prevent a very undesirable off-center creeping of the center buckle, very unfavorable to proper crash force distribution in the passenger's abdominal area. While the design of U.S. Pat. No. 3,887,233 overcomes the lack of snugness upon the passenger's lap, the lack of positive retention of centering of the application buckle, remains a problem. Also the crossing arrangement of the shoulder belts with the lap belt halves seems inconvenient and the belts do not store well out of the way when unoccupied, an important feature to promote public acceptance.

Finally, U.S. Pat. No. 4,919,488 seeks to address, maximally, the desirable feature of good stowability and therefore, ease of passenger entry into the seat. It employs an unconventional geared arrangement of two halves of the center-buckled lap belts. However it omits, entirely, an adequate means for snugly applying the lap belt to the passenger's lap, suggesting use of a fixed length lap belt for all passengers and such is surely not acceptable for wide use. While the above listed and discussed design patents have the greater quantity of the qualities of the subject patent application, there are other dual shoulder/single lap belt design patents but they all generally lack practicality, and also do not have means for positive retention of the centering of the center application buckle nor do they provide means for adequate distribution of crash forces over the abdominal area of the passenger.

In summary, none of the existing design patents, claiming improved dual shoulder belts, are incorporated into a total releasing and energy-absorbing and capturing restraint system or are equipped with an application-easing, proffering feature, as is proposed in the subject patent application. As will become apparent, all of the deficiencies discussed relative to the current art are uniquely overcome in the design for this patent application.

SUMMARY OF INVENTION

The fully-extended restraint system of this invention is intended to fully replace, in an improved manner, the functions claimed to be achieved by the combination of the current single diagonal shoulder belt and lap belt system and its supplemental air bag, or the basic belt restraint of this patent, is intended to serve as a necesssary life-saving adjunct to the current airbag. It employs padded dual shoulder belts to add lateral restraint as well as much improved forward restraint protection of the passenger not provided by the single diagonal shoulder belt. Also the face of the passenger does not suffer a violent impact with the very taut surface of an air bag which cannot be fashioned to be in any way face-conforming.

Furthermore, in extensions of the basic subject invention, the dual shoulder belt takeup reels are designed to be limited-releasing and energy-absorbing to a specified degree to allow the driver to impact more gently into a combination padded steering wheel/restraining bar device, all designed to be collapsible and energy-absorbing, or for the passenger seat or seats, to allow the passenger(s) to impact more gently into a padded collapsing and energy-absorbing capturing and restraining bar device.

The object of adding the limited-releasing, energy-absorbing shoulder belts along with the energy-absorbing and capturing devices to the fore of the seat occupants, is to allow the passenger to come to a complete halt, with respect to earth coordinates, over a longer distance toward the surface with which the vehicle has impacted, to dramatically reduce deceleration forces on the restrained passenger. If, for example, the vehicle's main structure linearly decelerates to a complete halt in two feet and the yielding restraint system allows the passenger's upper torso to concurrently linearly decelerate over another two feet, the deceleration forces on said upper torso would be halved.

Finally, safety agencies have found that one of their most daunting tasks is to induce auto passengers to apply even their current, less than optimally effective, unibelt seat belt restraint systems regularly. To encourage/induce and ease application of the subject patent claim SECURE system, for all configurations described, a novel proffering feature is therefore now added to the basic dual shoulder belt/lap belt restraint. This proffering system, upon seating of the passenger and door closure, automatically lifts and moves the dual shoulder belts and lap belt loosely about the auto passenger. The passenger then buckles the proffered halves of the shoulder and lap belts center fastening plates together, the shoulder belts being then automatically driven together and relaxed snugly upon the passenger's shoulders.

BRIEF DESCRIPTION OF DRAWINGS

Several combinations of the restraint harness and energy-absorbing devices in accordance with the invention will now be described by way of reference to the accompanying drawings.

Figure 11:
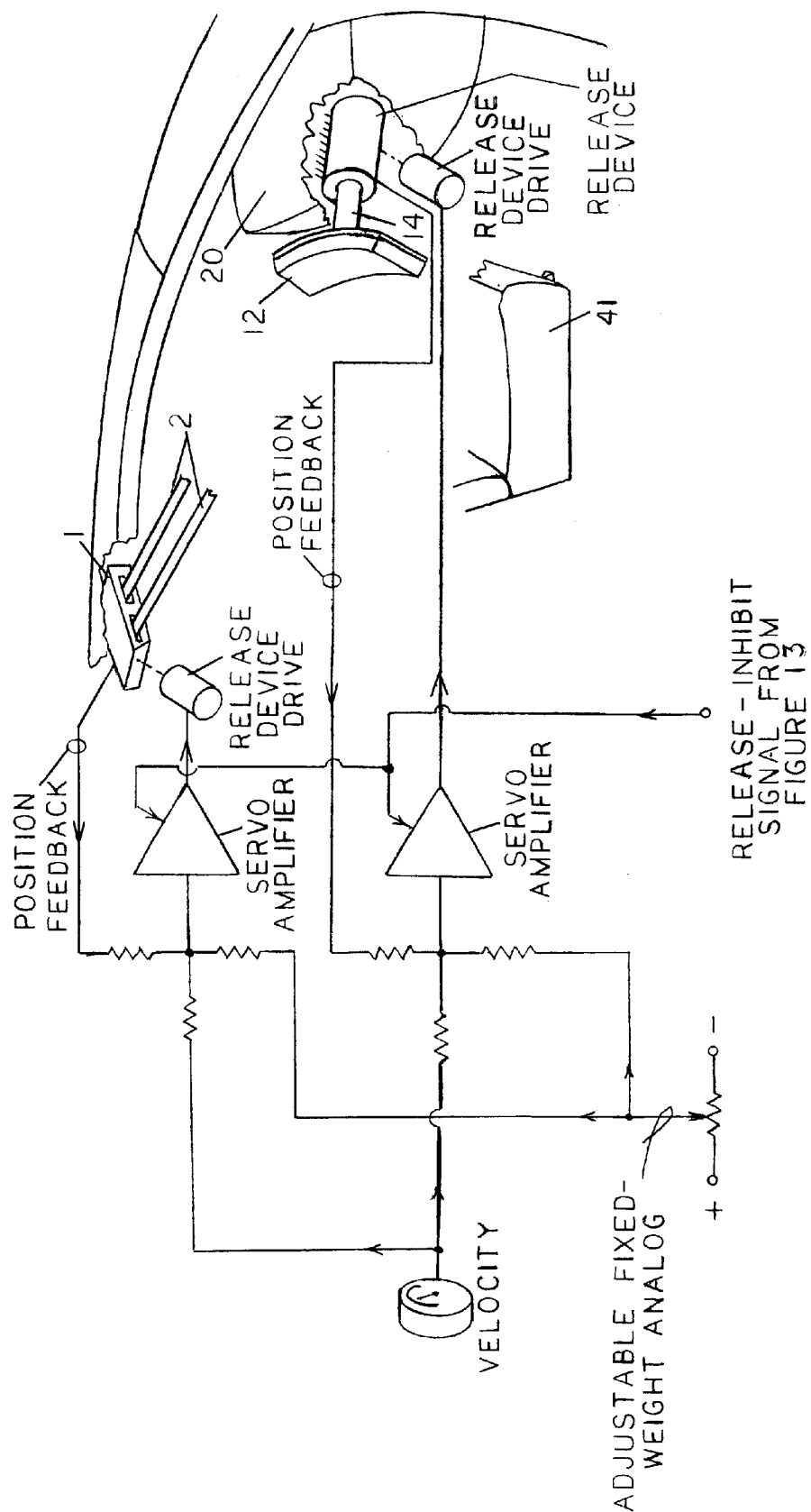
FIG. 11 shows a block diagram, applicable to either driver or passenger side position, of the electrical means for varying the release characteristics of the selected energy-absorbing devices of FIGS. 9 and 10 for a fixed passenger weight and for precise velocity at time of crash impact.
Figure 12:
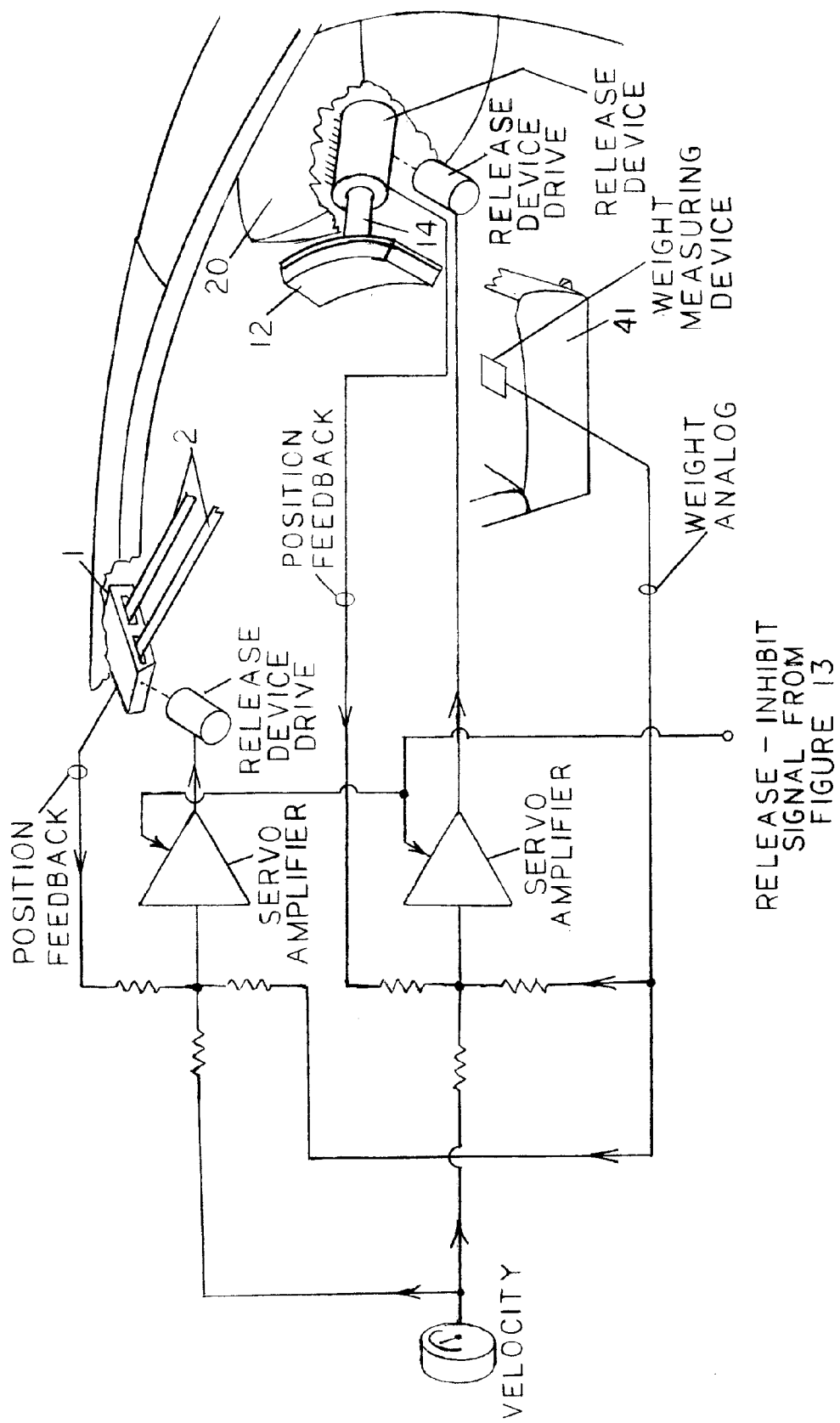
FIG. 12 shows a block diagram, applicable to either driver or passenger side position, of the electrical means for varying the release characteristics of the selected energy-absorbing devices of FIGS. 9 and 10 to adjust for both passenger weight and vehicle velocity at the time of crash impact.

The block diagrams of both FIGS. 11 & 12 include an input for a release-inhibiting signal. This release-inhibiting signal is generated by the release-inhibiting generation instrumentation, shown in the block diagram of FIG. 13, whenever the crash direction is excessively far off of the longitudinal axis of the vehicle to permit safe release of the shoulder belts.

DESCRIPTION OF PREFERRED EMBODIMENT

Figure 1:
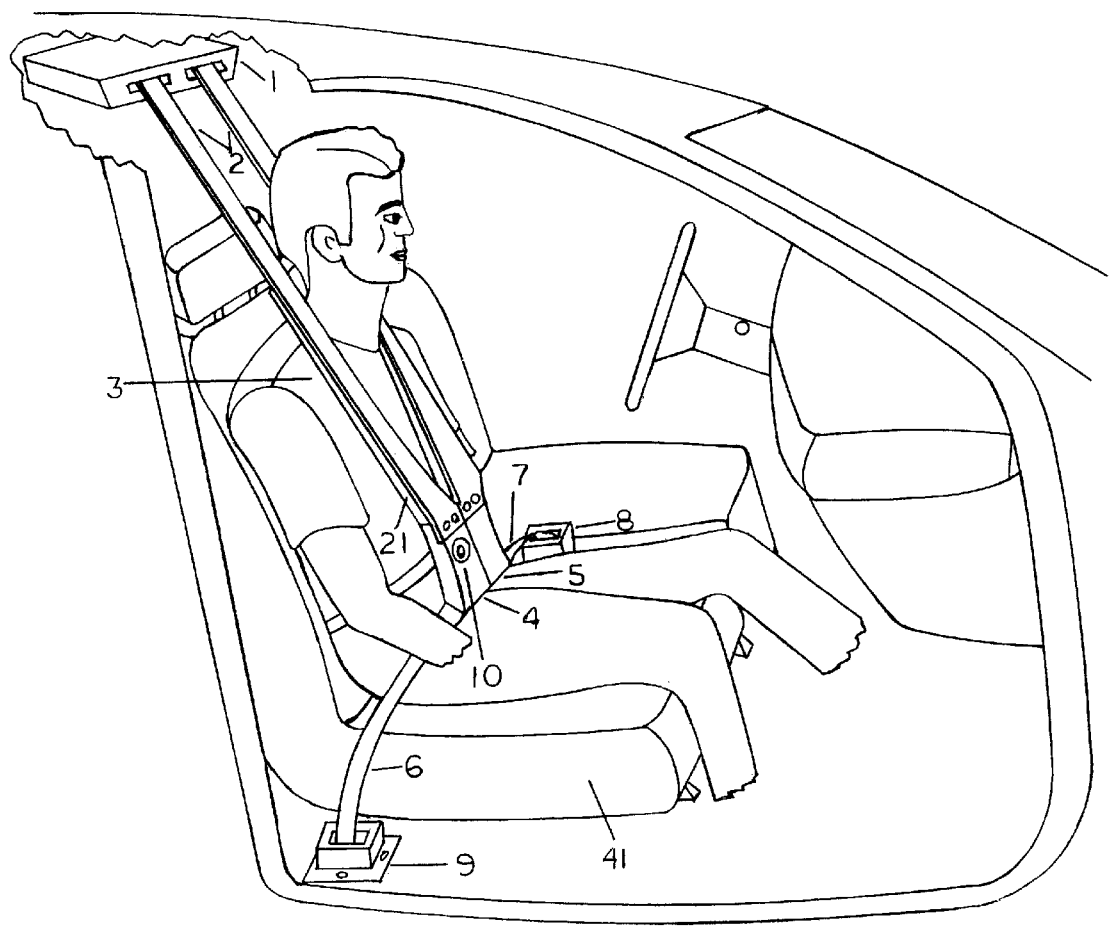
FIG. 1 shows a quarter front view of the basic, or un-enhanced, padded, tapered-width, dual-shoulder/single lap belt system emplaced on a passenger as can be applied to a passenger occupying any seat, either front or rear seat(s), of a typical single or multi-seat passenger-carrying vehicle.
Figure 2:
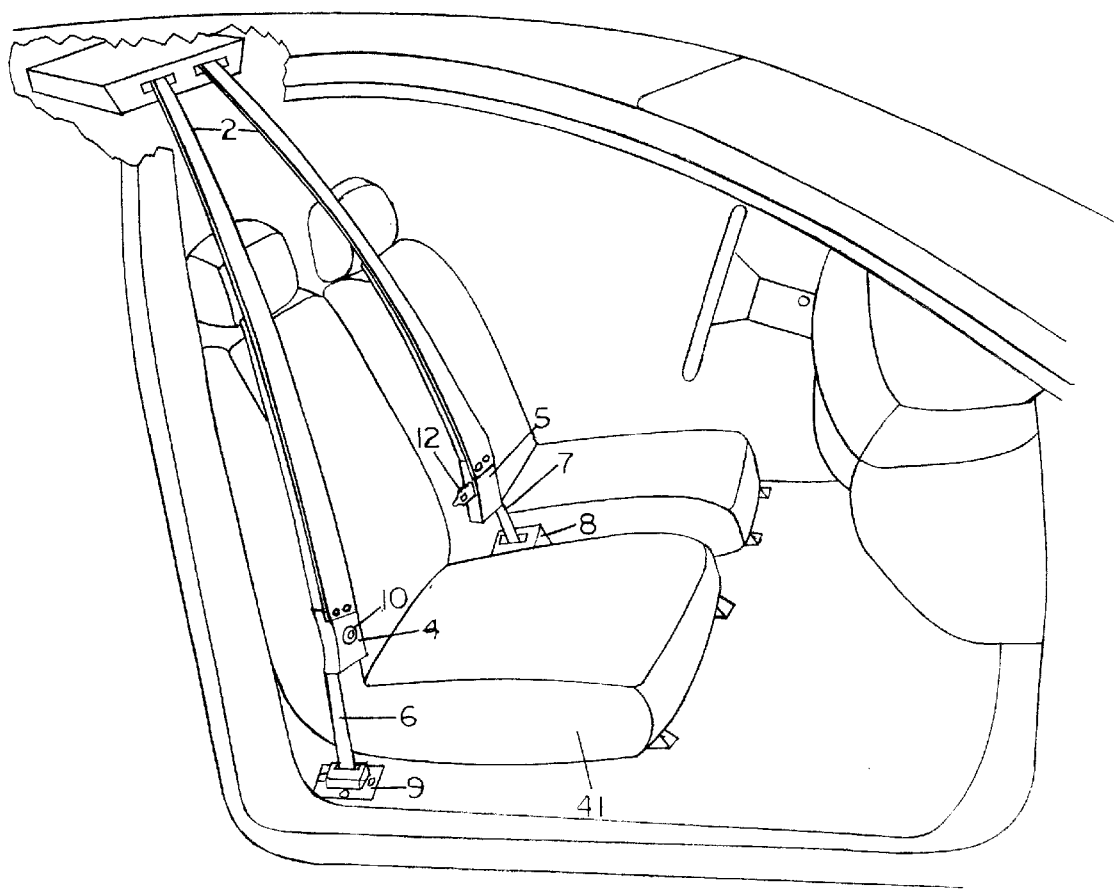
FIG. 2 shows a quarter front view of the basic, or unenhanced, dual-shoulder single lap belt system of FIG. 1 as seen in an unoccupied or stowed position.
Figure 3:
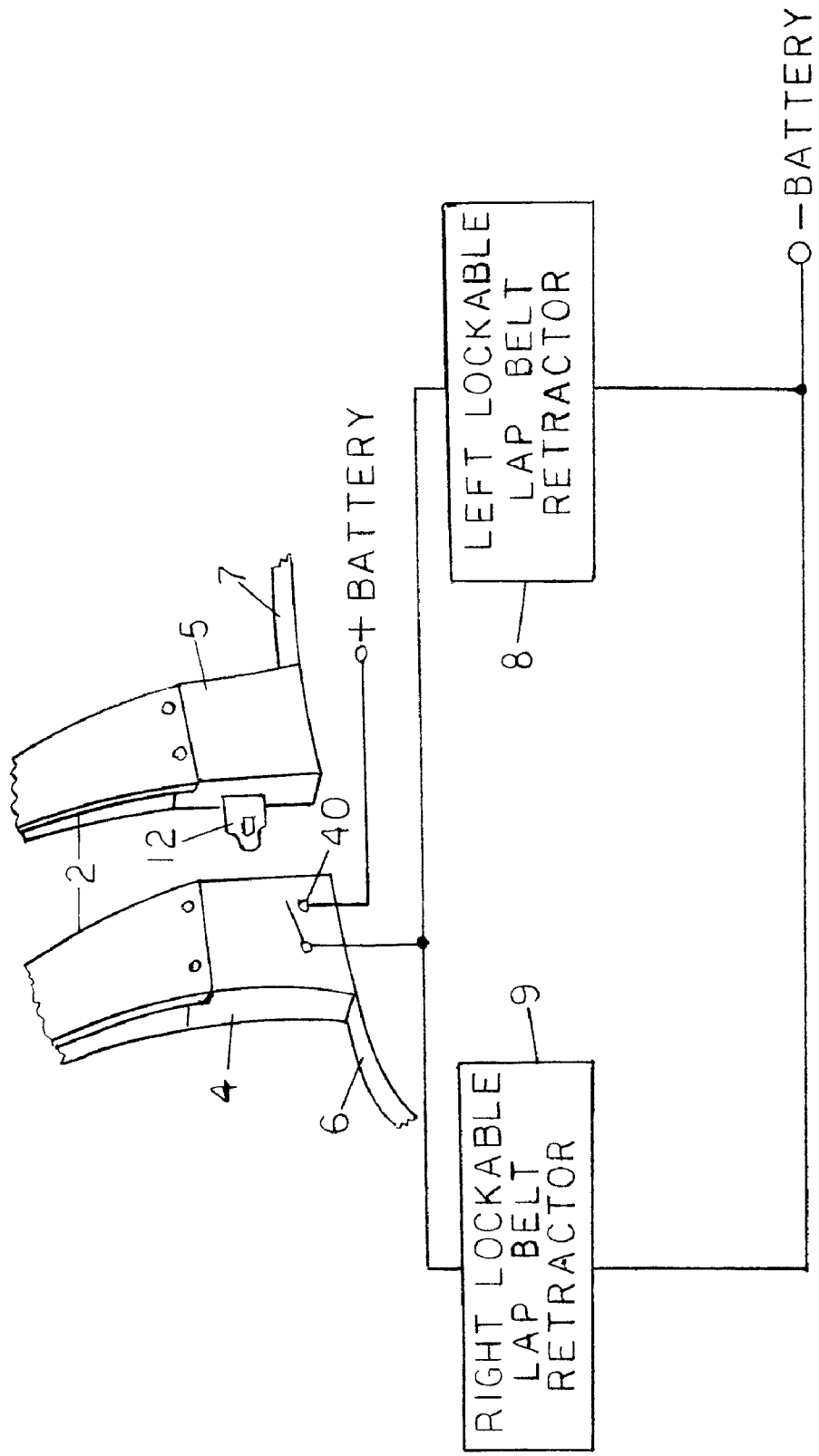
FIG. 3 shows a block diagram representation of the electrical means for automatically locking the floor-mounted, lap belt spring retractors, 8 & 9, of FIG. 1.
Figure 4:
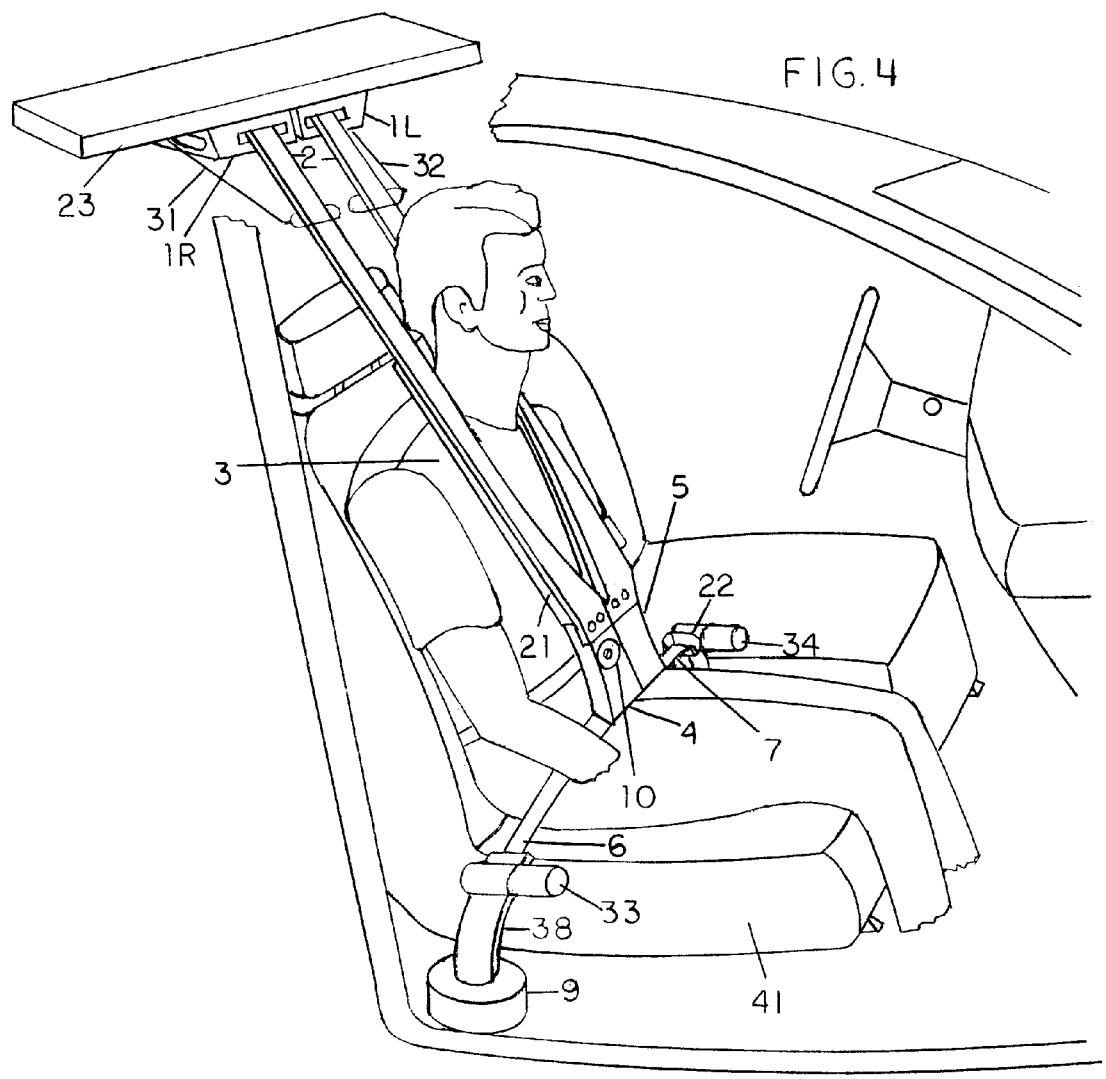
FIG. 4 shows a quarter front view of the basic dual-shoulder/single lap belt system of FIG. 1 with the proffering feature added.

Description of the preferred embodiment will be given using the proffering-equipped basic belt restraint as shown in FIG. 4. Except for the added hardware, improving facillitation of entry and exit to and from the belt restraint, hardware and energy absorbing release operation are the same for both proffering (FIG. 4) and non-proffering-equipped FIGS. 1–3) belt restraint systems.

Referring first to FIG. 4, a two-part, coupled retracting reel assembly 1R & 1L, each part having a retracting reel and including one inertia-locking mechanism acting commonly on the two reels, is, as a first method, indirectly mounted on a reinforced roof area above and to the rear of the passenger via a shoulder belt translator assembly 23, described later. An alternate method is to mount the translator 23 and attached two-part reel assembly 1R and 1L on the back side of a sufficiently tall and strong seat back.

The reel-locking mechanism is selected to be the type that normally allows the padded, tapered-width dual belts 2 to be reeled off freely against the action of the retraction-reeling spring, but which locks up if there is a sudden deceleration of the vehicle as sensed by a deceleration-sensing device with the locking device acting commonly on the twin reels. The dual takeup reel mechanism 1R & 1L may also include the current unibelt common pull and lock feature that permits the seat occupant to eliminate the retractor reel spring force, on the body, by pulling down slightly and then releasing the shoulder belt to a first-locking position.

From the twin spools internal to the dual retracting reel assembly 1R & 1L, padded, tapered-width twin belts 2 run down over the passenger's shoulders and chest area 3 to their respective attachment points to the two-part abdominal force-distributing and belt-fastening plate 4/5. Said plate halves or plate 4 and 5, are manually fastened together by a conventional built-in snap, provided with a recessed, releasing button 10. The belt system is instrumented so that when the passenger pulls the two halves of the fastening plate 4 and 5 together and engages the male snap portion 12 into the female portion located in the right-hand portion of the fastening plate 4, the electrical switch 40, shown in FIG. 3, is closed to cause battery current to flow through the left and right electrically-lockable lap belt retractors 8 & 9, locking the lap belts firmly in place. This is instrumented as shown in the block diagram of FIG. 3. This leaves the lap belt firmly in place but without any discomforting retracting spring pressure on the passenger's lap area. Also, locking the two lower lap belt retractors, assures a permanent ideal centering of the force distributing and fastening plate 4/5 and prevents it from creeping either to the left or to the right due to random passenger motions in the seat 41 or unevenness in retractor spring strength at varying lengths of deployment.

For possible crash-related battery power interruption, the electrical-locking mechanisms in retracting reel assemblies 8 and 9, are designed to be inherently slow releasing such that the lap belt will not loosen for a period equal to or greater than a maximum anticipated crash duration. This can typically be accomplished, electrically, by a local electrical charge-storing capacitor, or mechanically, by a dash pot, or the like, slowing release, typically, of a pawl arm operating on a locking rachet normally pulled in by a solenoid and pulled back by a releasing spring.

The lap belt consists of a right-hand portion 6 running through proffering tube 38 and affixed at one end, via an electrically-lockable retracting takeup reel assembly 9, to the floor of the vehicle, and at the other end, to the right-hand portion of the force-distributing and belt-fastening plate 4. The left hand portion of the belt 7, running through proffering tube 22, is also affixed, at one end, via an electrically-lockable retracting takeup reel assembly 8 (see FIG. 5) to the floor of the vehicle and at the other end to the left-hand portion of the force-distributing and fastening plate 5.

The two halves of the force distributing and belt fastening plate 4 and 5, may consist of any sufficiently strong and semi-flexible, body-conforming material, internally, and covered by a substantial layer of soft plastic or rubber material to cushion and distribute the crash shock upon the passenger. Additionally, said force-distributing plate halves 4/5 are designed to facillitate practical and completely secure attachment of the dual shoulder belts 2, said belts tapering to a wider width and including padding 21 for a length from just above the shoulder and chest area 3 to their maximum width at the attachments to the force-distributing and fastening-plate halves 4/5. Such distributing of forces over the abdomen and chest and shoulder area of the motorist will greatly reduce the frequent injuries sustained with use of the conventional narrow web lap and single shoulder belts. The force-distributing and belt-fastening plate, as described, is one typical and effective embodiment. Sophistications may be added to said force-distributing and belt-fastening plate such as perforating with small closely placed holes to provide ventilation to the covered abdominal area. Special edge contours may also be applied to optimally support the human abdomen. Such obvious sophistications added to the described basic plate are considered covered by this disclosure.

Finally, the subject dual shoulder/single lap belt system fits well and provides full and effective restraint for all sizes of passengers in contrast to the current widely used single shoulder belt design not fully effective for children and smaller adults.

Figure 5:
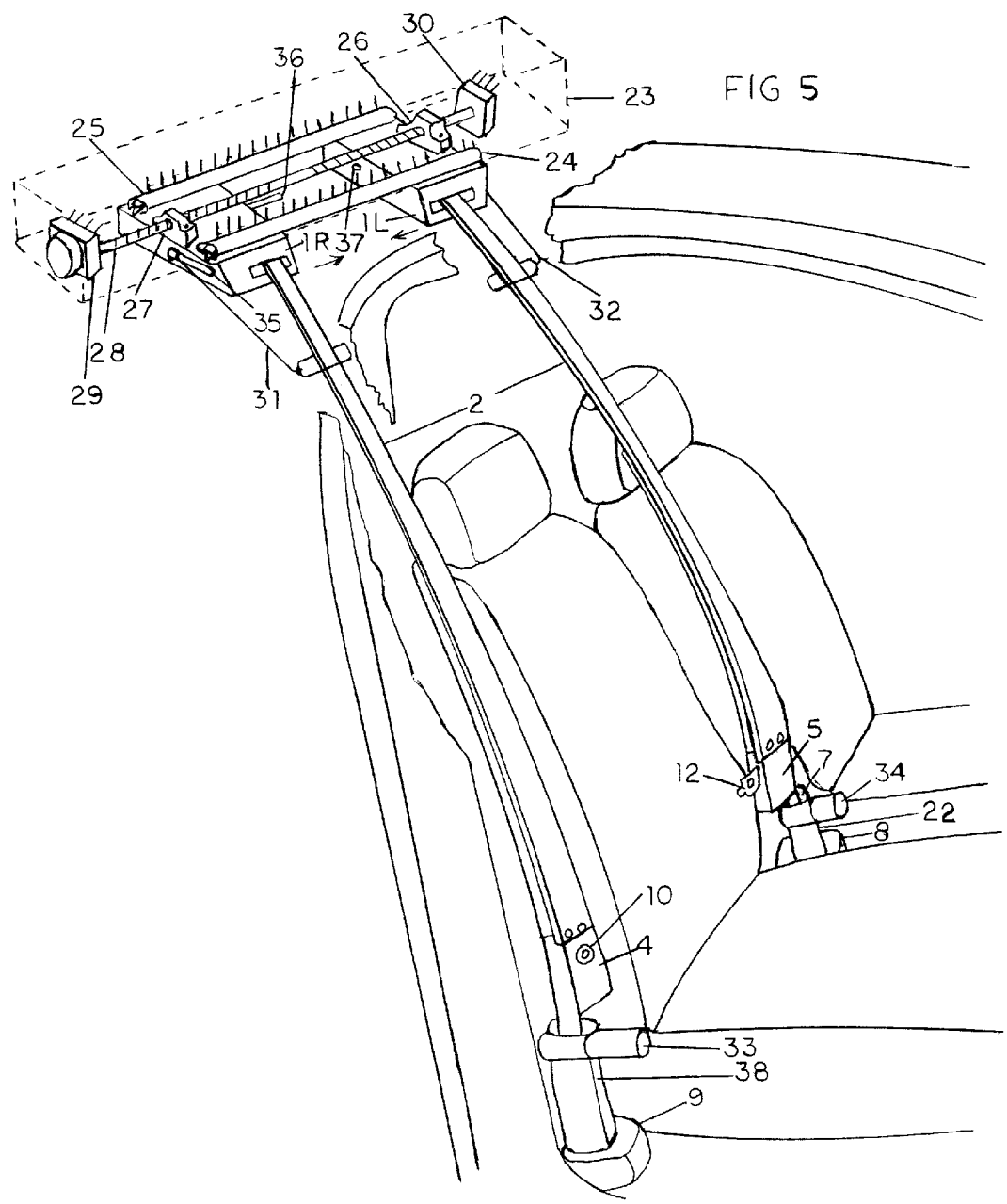
FIG. 5 shows a quarter front view of the proffering-equipped dual shoulder/single lap belt system of FIG. 4 as seen in an unoccupied or stowed position, and with a portion of the proffering system handling the dual shoulder belts, shown in electromechanical schematic form.

Referring now to FIG. 5, the subject safety belt system is shown in the stowed position, that is, the lap belt retractors 8 & 9, having stronger retractor springs than the shoulder belt retractors of two-part assembly 1R & 1L, has caused the two halves of the lap belt to retract with the two halves of the fastening plate 4 & 5 coming to rest against the exits of the two proffering tubes 38 and 22. Also the mechanism of shoulder belt reel translator 23 has separated the two shoulder belts reel assemblies 1R and 1L, and thus shoulder belts 2, to full or maximum separation, allowing easy exit by the passenger from the passenger seat and shoulder belts.

The shoulder belt reel translator 23 is shown instrumented in typical electromechanical form to achieve the end goal of lifting the shoulder belts forward away from the passenger both in entering of the belt system as well as leaving from same and to move the shoulder belt reel assemblies 1R and 1L either apart or together as required by the phase of either entering or leaving the belt system.

Achieving such lifting away and separating or bringing together of the shoulder belts is not limited to the method of the basic electromechanical mechanization shown in the shoulder belt reel translator 23 diagram of FIG. 5. It could, for example, be achieved by a pair of shoulder belt lifters that provide both the function of moving the belts out and moving to either separating or bringing them together. Such lifter arms would thus have to be able to be commanded, not only up and down, but also sideways, either way, from the passenger's shoulder and be capable of extending and retracting in length. The mechanization depicted as the shoulder belt reel translator 23 assembly is one way, of many, of achieving the function of lifting and separating or bringing together the shoulder belts about the body of the passenger and all such similar schemes are claimed in this patent application.

In said depiction of the shoulder belt reel translator 23, the shoulder belt reel assemblies 1R and 1L are shown supported by, and riding on front 24 and rear 25 translator rails. The reel assemblies 1R and 1L are moved perpendicularly to the longitudinal axis of the passenger vehicle, by the translator screw rod 28 driven and supported by a stepper motor 29 and translator screw rod bearing 30, the screw rod 28 having opposite-handed screw threads on each half of its total length, one half driving the right shoulder belt reel assembly 1R, and the other half of the screw rod 28 driving the left shoulder belt reel 1L through attached screw blocks 27 and 26 respectively. In such typical instrumentation, stepper motor movement of the translator screw rod 28, in say the clockwise direction, would move the shoulder belt reel assemblies 1R and 1L closer together, while translator screw rod 28 movement in the counterclockwise direction would move the shoulder belt retractor reel assemblies 1R and 1L further apart. The lifter span adjustment slot 35 is provided to allow commandable internal mechanism to adjust the span or reach of shoulder belt lifter 31 on shoulder belt reel assembly 1R. A similar facility is also provided for shoulder belt reel assembly 1L. Finally, when the shoulder belt reel assemblies 1R and 1L are driven close together in the operating position, a shoulder belt reels coupling rod 36, on assembly 1R, enters port 37 to couple with the reel shaft in assembly 1L.

Figure 6:
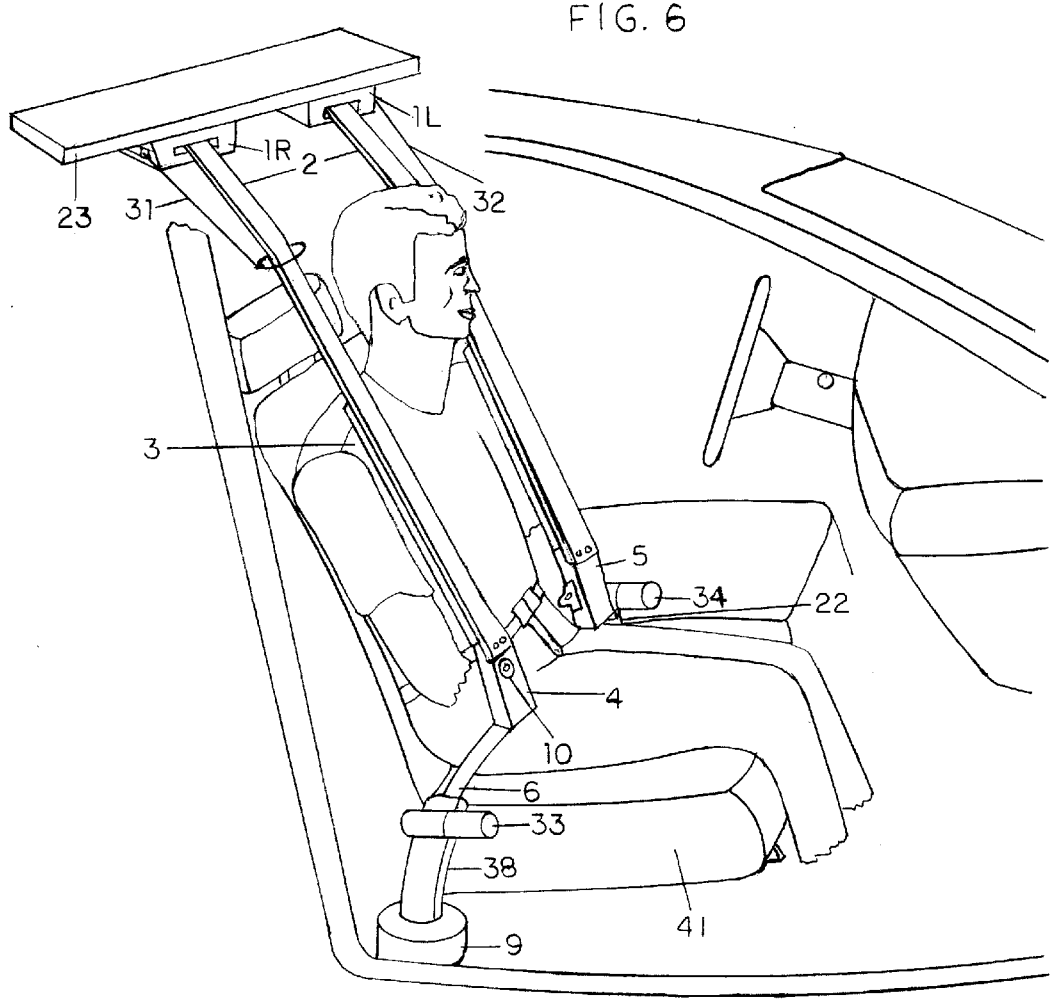
FIG. 6 shows a quarter front view of the proffering-equipped dual-shoulder/single lap belt system of FIG. 4 with the shoulder and lap belts being held in the proffering position.

FIG. 6 shows the subject safety belt system in the proffered position ready for the seat occupant to conveniently grasp and apply the belts by snapping together the two fastening plate halves 4 and 5. Here the shoulder belt retractor reel assemblies 1R and 1L, attached to translator assembly 23, have placed their shoulder belt lifters 31 and 32 in the up position and the translator assembly 23 has driven the shoulder belt reel assemblies 1R and 1L closer together, from the stowed or passenger-entering position, so that the shoulder belts lie loosely above the edges of the passenger's shoulders, while the proffering drive motors 33 and 34 have driven the two fastening plate halves 4 and 5, from their seating on the end of the proffering tubes 38 and 22, to a position substantially over the edges of the hips of the seat occupant by driving out a semi-stiff section of each half of the two-piece lap belt 6 and 7. These semi-stiff sections of the two halves of the two-piece lap belt could be driven by simple opposing friction rollers or each of the edges of the both semi-stiff sections could be fitted with sprocket-drive eyelets for a more precise sprocket drive commanding arrangement. For either of these two typical means for driving out or proffering the two halves of the two-part fastening plate 4 & 5, a releasing clutch mechanism must be included that releases the drive-out mechanism so that the seat occupant needs to overcome only the retractor reel spring force to pull and snap together the fastening plate halves.

Figure 7:
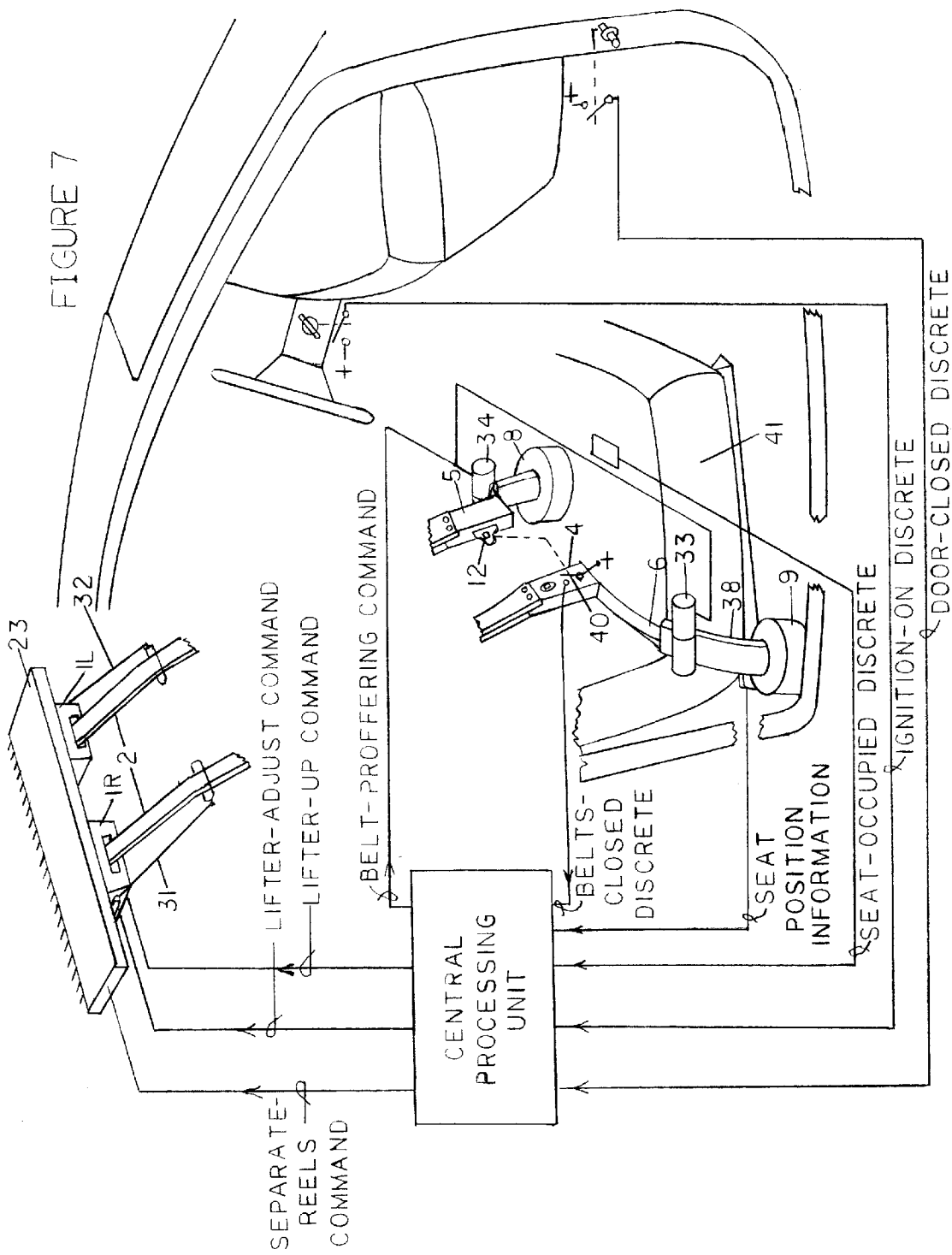
FIG. 7 shows a pictorial block diagram of the interconnections for the electrical and mechanical elements of the proffering feature.

FIG. 7 is a block diagram of the signal sources, signal processing and command drive signals generated to control the proffering feature just described. Five signal inputs on the lower left portion of the diagram are shown going into the vehicle central processing unit (CPU), of which four are discretes that could be obtained from simple switches as depicted. The seat position signal must be encoded to indicate at least three positions, close, medium and far, for short, medium and tall height passengers, respectively, and is used to command the lifter span as a function of the seat position.

The first of the four output drives shown on the upper left of FIG. 7, the shoulder belt separate-reels command, is implemented, among many schemes possible, as a stepper motor drive to provide simple open-loop positioning of the shoulder belt reels 1R & 1L. The second output drive signal, lifter-adjust command, can be any kind of motor drive to one of three index positions for close, medium and far seat positionings, respectively. The third output drive signal, the shoulder belt lifter drive, can be instrumented as a discrete solenoid drive command to raise or lift up the shoulder belt lifters 31 & 32. The fourth output drive signal, the lap belt proffering drive, cam also be implemented as a stepper motor drive 33 & 34, to feed out or proffer the lap belt halves 6 & 7 and the attached two halves of the fastening plate 4 & 5.

Figure 8:
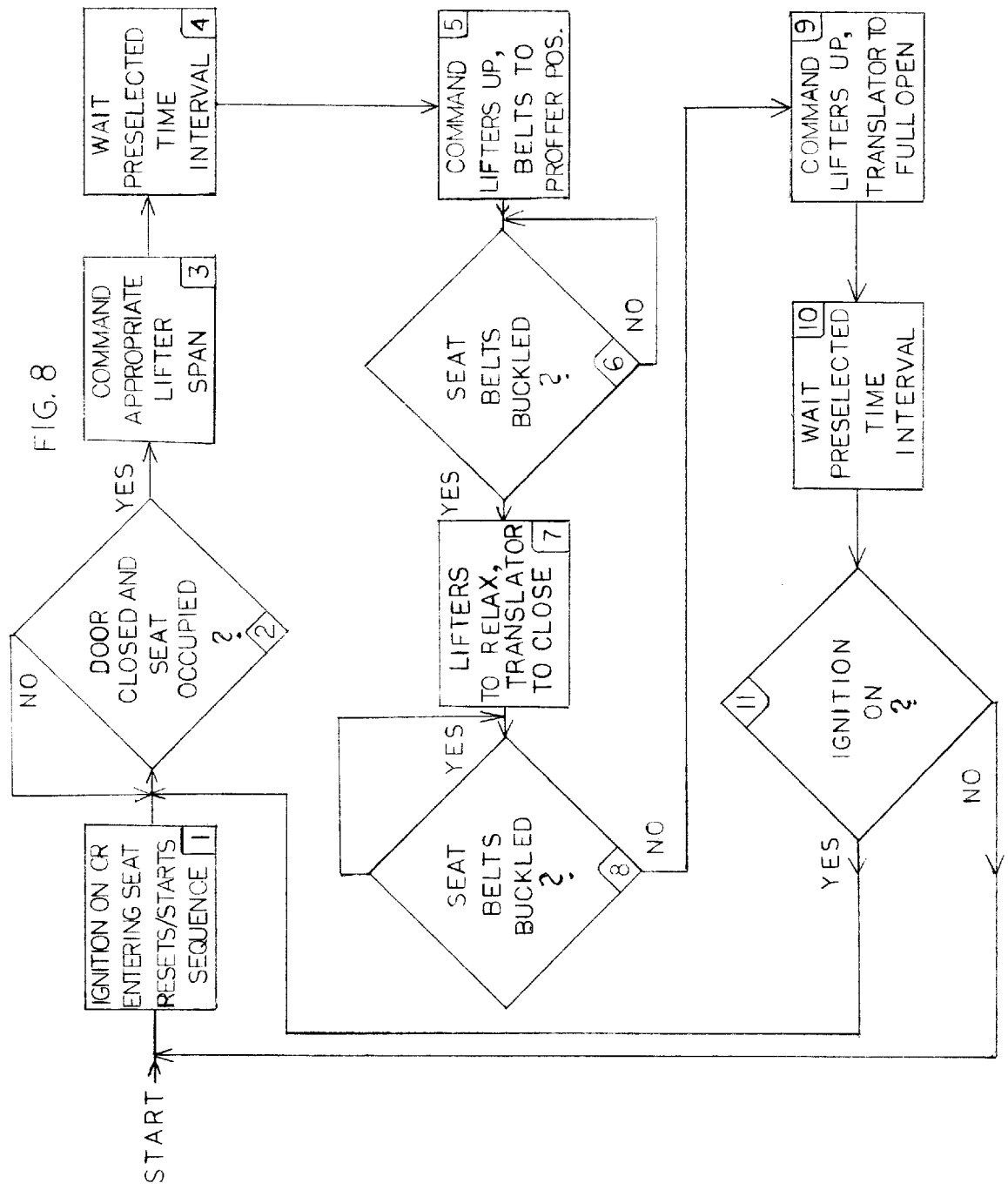
FIG. 8 shows a flow diagram for the proffer feature control sequence executed by the Central Processing Unit (CPU).

FIG. 8 shows a flow diagram depicting systems control of the proffering feature operation. Beginning on the left of the diagram, Block 1, the CPU begins its control sequence by detecting presence of either the seat-occupancy or the ignition-on discretes to reset and start the CPU sequence. In Block 2, the CPU continuously queries if both the seat-occupancy and door-closed discretes are present, and when present, conditions are met to first initiate lifter span adjustment, Block 3, and after a preselected time wait interval to allow the span to adjust to that commanded, as indicated by Block 4, the CPU commands lifters to lift the shoulder belts up far enough to the fore of the passenger seat occupant to clear the seat occupant's shoulders and then sequentially commands the translator 23 in Block 5, to reduce the shoulder belt reel separation and to power drive out of the proffering tubes 38 & 22 the lap belt halves 6 & 7, by the proffer drive motors 33 & 34, such that the shoulder belts are over the edges of the occupant's shoulders and the two halves of the fastening plate 4 & 5 are out over the outer edges of the passenger's hips.

At this point, the two halves of the fastening plates 4 & 5 are very conveniently located for the seat occupant to grasp and snap them together, and to not do so, would mean leaving an inconvenient encumbrance to the fore of the seat occupant; hence the passenger is essentially forced to complete snapping together of the fastening plates 4 & 5. When the seat occupant does so, the "seat belt buckled?" query in Block 6 becomes true and the shoulder belt lifters 31 & 32 are commanded to relax loosely upon their respective shoulder belts, the shoulder belts, in turn, now lying loosely upon the seat occupant's shoulder edges. Then the shoulder belt reel translator 23 is commanded to close together, coupling the shoulder belt reels 1R & 1L together via the coupling rod 36 entering coupling port 37, shown in FIG. 5, and also emplacing the shoulder belts 2 fully upon the seat occupant's shoulders. The CPU then continuously monitors to detect when the seat belts are unbuckled to normally indicate that a destination has been reached and to begin the exiting process for the proffering feature.

For this, Block 9 indicates that the CPU commands the shoulder belt lifters 31 & 32 to lift the shoulder belts up and away from the shoulders of the seat occupant and then commands the shoulder belt reel assemblies 1R & 1L to separate maximally to allow total ease of exiting the seat. Block 10 indicates that a preselected wait period begins to allow the passenger a reasonable time to exit the seat.

After this time interval has expired, the CPU queries in Block 11 whether the ignition is on. If the ignition is on abnormally long, the CPU returns to Block 2 to query whether either the door is still closed and if the seat is now still occupied. If both are still true, the CPU continues on to again go into the proffering sequence and this would only occur if the seat occupant were trying to defeat the system. If the ignition is found to be off in the query in Block 11, the CPU returns to the start position awaiting the turning on of the ignition once again. If the ignition is left on, say to discharge a passenger, the CPU returns to Block 2 awaiting another door-closed, seat-occupied situation. As indicated in Block 1, the ignition being turned on again or a passenger entering the seat again, resets the system to start its normal proffering sequence again.

Figure 9:
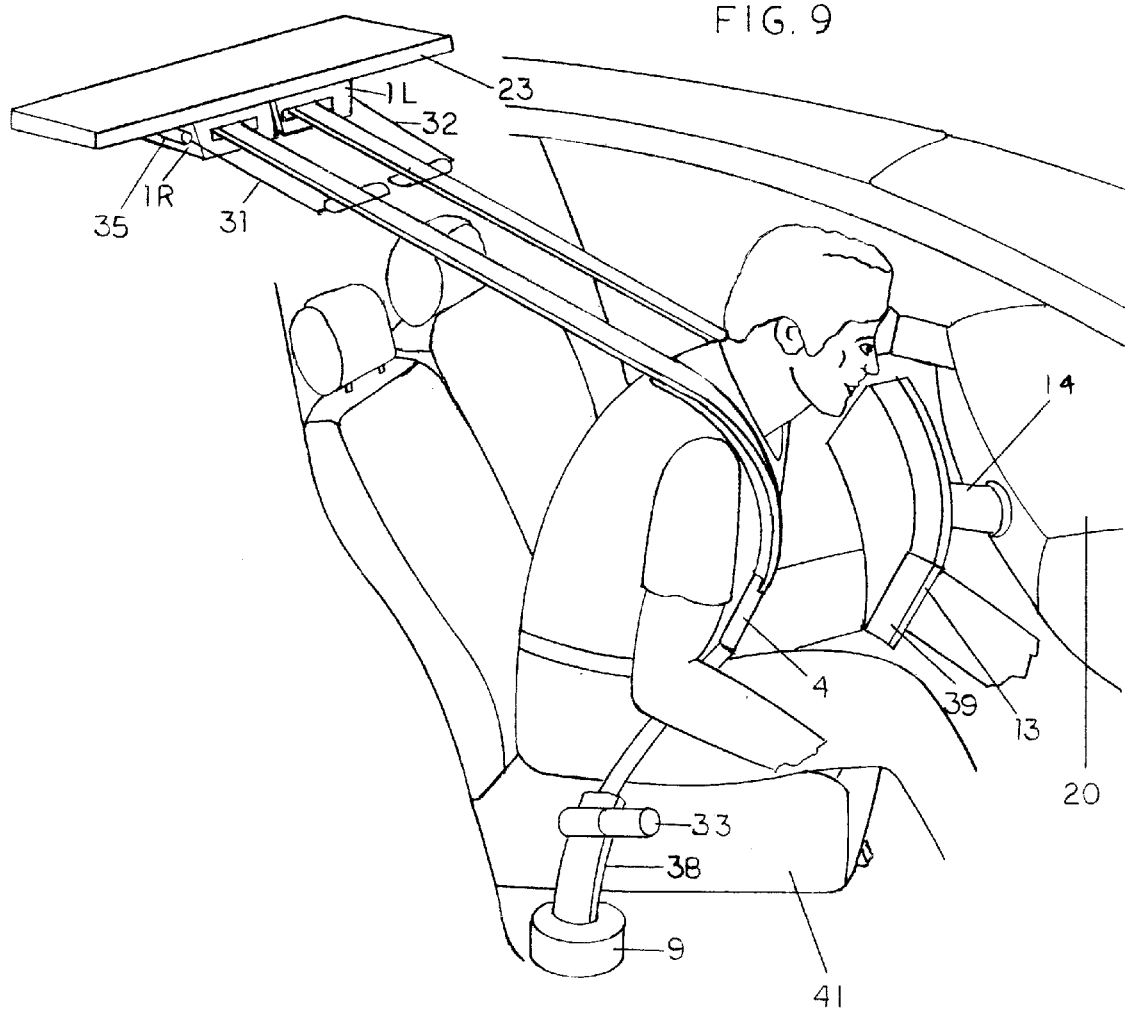
FIG. 9 shows a quarter front view of the enhanced, limited-releasing, energy-absorbing version of the proffer-equipped, padded, tapered-width, dual shoulder/single lap belt system of FIG. 4, applied to the passenger side of the vehicle front seat. Note that the energy-absorbing feature is applicable to the basic restraint belt system of FIG. 1 as well. Here, for principally frontal crashes, the upper torso of the passenger is permitted to decelerate over an extended distance via energy-absorbing, releasing shoulder belts, said passenger also being restrained by a padded, energy-absorbing, capturing and restraining bar device located to the fore of the passenger
Figure 10:
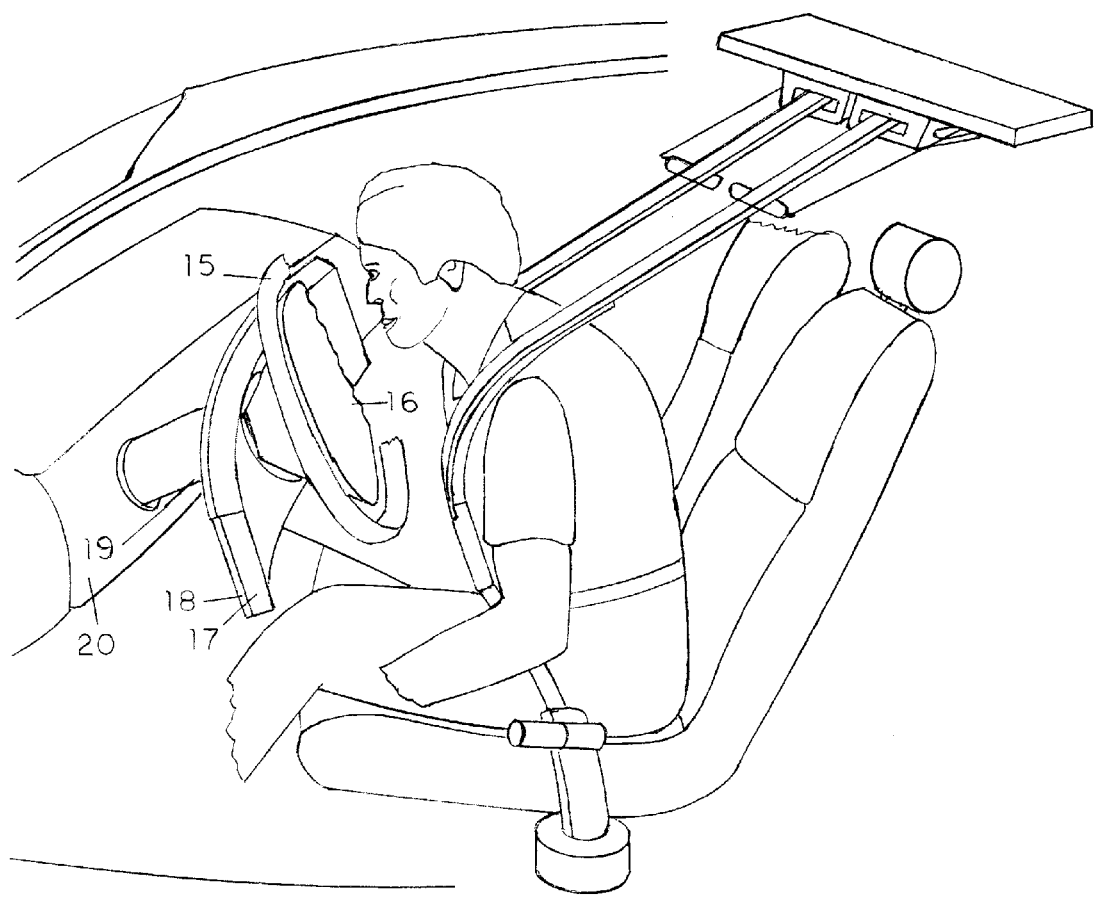
FIG. 10 shows a quarter front view of the proffer-equipped, padded, tapered-width, dual shoulder/single lap belt system of FIG. 4 for the driver's side enhanced with several extra safety features. Note that these extra safety features can be equally well applied to the non-proffering-equipped basic restraint belt system of FIG. 1. First, for principally frontal crashes, the shoulder belts takeup reel has an added energy-absorbing, limited-releasing feature. Secondly, the steering wheel includes deeply recessed padding along with an easily-telescoping column feature that allows this telescoping steering wheel to be captured by a restraining bar, itself collapsible and energy-absorbing.

FIGS. 9 & 10 show the fully-enhanced safety restraint systems for the front passenger and driver sides, respectively. Each involves, in part, the limited-releasing of the shoulder belts feeding from the two-part retractor 1R & 1L for both the two fully-enhanced safety restraint systems configurations, as well as for all reduced enhanced-safety restraint system configurations, described later. Such limited releasing of the shoulder belts must be inhibited completely for any crash that is more than a maximum allowable angle off the longitudinal or main-axis of the vehicle so as to prevent the motorist colliding with parts of the vehicle. Such maximum allowable angle is a function of the dimensions and the particular enhanced-safety configuration installed in the vehicle.

Figure 13:
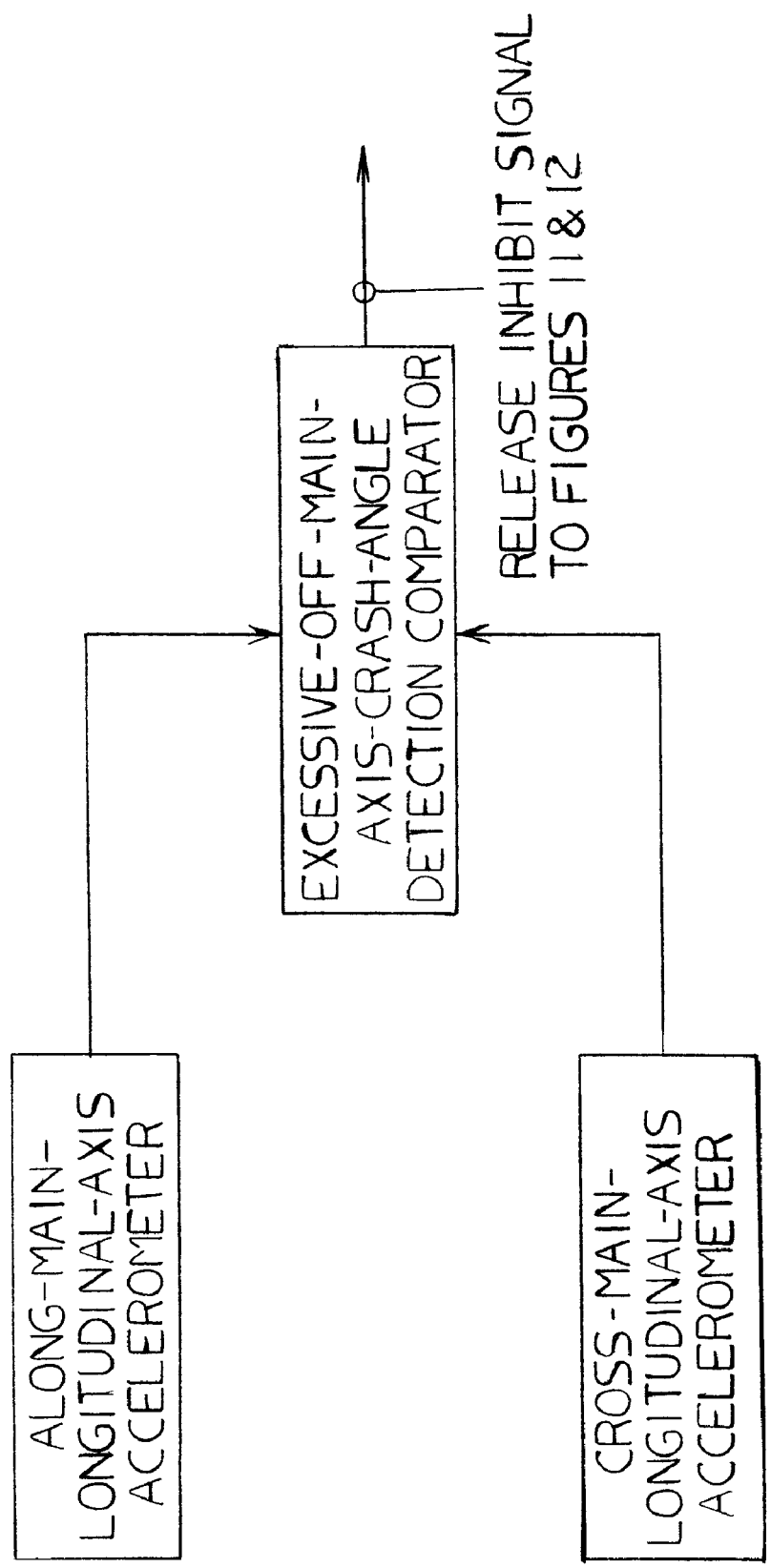

FIG. 13 shows a block diagram representation of a typical instrumentation for generating a shoulder belt release-inhibiting signal for all fully and partially safety-enhanced systems, as described later. Signals from along and cross longitudinal axis accelerometers are fed to an off-axis limit comparator, to generate a release-inhibiting signal, generated whenever the line of crash is too far off of the vehicle longitudinal axis for safe shoulder belt release. The comparator limit is set at installation as appropriate for the particular vehicle and its enhanced-safety configuration.

Referring now to FIG. 9, the fully enhanced safety restraint system for the front seat passenger side includes an added deployable, limited-releasing, energy-absorbing capture and restraint bar assembly 39, 13 and 14. Also the two-part take-up and inertia-locking reel assembly 1R & 1L is additionally equipped with an excessive-off-main-axis crash-angle inhibited limited-releasing, energy-absorbing feature, these two releasing functions all working together to compliment the crash deceleration profile of the particular vehicle being equipped, to linearly decelerate the passenger in the event of a crash. This passenger-side restraint bar is typically one foot in height by 2.5 to 3 feet in width, of concave shape on the surface toward the passenger, to enhance the lateral as well as full forward restraining of the passenger during a crash. The restraint bar assembly is shown consisting of a concave shaped, face-conforming padding 39 affixed to a rigid back plate 13 in turn held by a piston rod 14 operating into a cylindrical cavity. Said restraint bar assembly is designed to not allow rotation about the piston rod 14 axis. For a resetting or recyclable instrumentation, in one method, a non-compressible fluid would be forced through a control port in the cylindrical cavity by the piston rod to linearly absorb crash impact forces on the restraining bar to minimize deceleration forces on the passenger. In this method of achieving controlled deceleration of the passenger in a crash, the fluid is forced through a control orifice into a retaining container from which it is again drawn into the cylinder whenever deployment occurs again. Alternatively, in a less expensive instrumentation, said capture bar and restraint assembly could be designed to have the piston rod 14 impact into a crushable non-reuseable material to absorb the upper torso crash energy to provide optimum linear deceleration of the passenger. Many other non-recyclable methods to provide a releasing energy-absorbing function may also be found in commercial use today. Also the number of pistons 14 is not limited to just one as shown in FIG. 9 for the passenger side or FIG. 10 for the driver side. A two-piston support can be used as well. In one possible method, the restraining bar assembly, consisting of components 39, 13 and 14, would slowly deploy toward the passenger, from its stowed position away from the passenger, whenever a passenger's weight is sensed as present by a seat weight sensor and if the vehicle doors are closed and the engine ignition is turned on. Said restraining bar would return to its retracted or stowed position away from the passenger whenever the engine ignition is turned off and the passenger side door is opened. Retraction or deployment of the restraining bar is not limited to the sequence just described. Other conditions for retraction and deployment, such as just opening the door, could also be employed and it is not the intent of this patent to limit schemes or conditions for restraining bar retraction or deployment.

Referring again to FIG. 9, a lesser but useful safety enhancement is obtained by deleting the capture and restraining bar consisting of components 39, 13 & 14, and reprogramming the excess-off-main-axis-crash-angle-inhibited limited-releasing and energy-absorbing safety enhancement of the two-part shoulder belt retracting and inertial-locking reel assembly 1R & 1L to provide the additionally required, energy absorption provided by said capture and restraining bar used in the fully enhanced system. An absolute stop must now also be added to the two-part shoulder belt retractor reel assembly 1R & 1L to prevent passenger impact with the instrument console 20.

Referring now to FIG. 10, the fully enhanced safety restraint system for the driver's seat position has an added heavily-padded, easily-telescoping, deeply-recessed steering wheel assembly 15 and 16 collapsing into a releasing, energy-absorbing capture and restraint bar assembly 17, 18 and 19. In addition, the two-part take-up reel and inertia-locking assembly 1R & 1L is also equipped with an excessive-off-main-axis-crash-angle-inhibited limited-releasing, energy-absorbing feature, all working together to compliment the crash deceleration profile of the particular vehicle being equipped to linearly decelerate the passenger upon occurence of a maximum-impact crash. Typically, in a crash, the upper torso of the driver moves forward as the releasing and padded, tapered-width dual belts of the energy-absorbing two-part shoulder belt take-up and inertia-locking reel assembly 1R & 1L optimally permits under the crash forces occuring. If a crash force is of sufficient intensity, the upper torso of the driver moves further, striking first the easily-telescoping steering wheel assembly 15 and 16 and forcing it to be captured by the capture and restraining bar 17 and 18. Said capture and restraining bar, attached to a piston rod 19, coaxial with the steering column and also constrained against rotation around the longitudinal axis of said piston rod 19, is now forced forward via piston rod 19 to its limit of travel when sufficient crash forces occur, all operating together to optimally linearly decelerate the driver under system maximum crash force conditions.

The upper surface plane of the capture and restraint bar 17 and 18 is positioned approximately two inches from the lower surface plane of the steering wheel 15 to allow freedom of movement of the hands of the driver upon said steering wheel. Similar to the passenger side, but because the capture and restraining bar piston rod 19 must be hollow and coaxial to the steering column, the rod must operate into an annular cavity for energy absorption releasing via a recyclable hydraulic system method. Alternatively, the hollow capture and restraining bar piston 19 could operate into an annular cavity containing non-recyclable energy-absorbing crushable material.

Referring again to FIG. 10, two lesser, but useful, safety enhancement combinations can be obtained by, a) deleting the capture and restraint bar assembly consisting of components 17, 18 and 19, retaining the easily telescoping, deeply-recessed, padded steering wheel assembly 15 and 16 and reprogramming the excessive-off-axis-crash-angle-inhibited limited-releasing and energy-absorbing feature of the dual-belt, two-part retracting and inertial-locking reel assembly 1R & 1L to provide, additionally, the energy absorption as provided by said capture and restraining bar in the fully enhanced system, b) again deleting the capture bar and restraint assembly consisting of components 17, 18 and 19, reconfiguring the deeply-recessed, padded, steering wheel assembly 15 and 16 to provide a releasing and energy-absorbing characteristic approximately as provided by the capture bar energy-absorbing device of the fully enhanced system to compliment the releasing energy-absorbing shoulder belt reel of a fully enhanced system.

Both of these reduced safety-enhanced system configurations can, theoretically, provide the same optimal linear deceleration of the passenger for directly-head-on crashes but lacks as an effective an off-line capture feature as provided in the fully enhanced system by capture bar being included therein.

In the design for the enhanced restraint systems, the maximum distance release of the shoulder belts and the capture and restraint bar assembly, occurs only for a passenger of maximum design weight in combination with a specified maximum crash velocity. Thus maximum release distance for both energy-absorbing devices would occur for only a small percentage of crashes, albeit still providing useful energy absorption protection in all lower velocity crashes and with passengers of lesser weight than maximum system specifications.

To obtain maximum release distances for all combinations of vehicle velocities and passenger weights, and thereby reducing deceleration forces upon the passenger to a minimum at any speed, a "smart" release system is used. As shown in the release system block diagram of FIG. 12, an electrical analog of the passengers weight is obtained from a weighing system instrumented in the passenger's seat 41 and an electrical analog of the passenger vehicle velocity is obtained from the vehicle's speed measuring system and these two electrical analog signals are combined, properly scaled, in a servo amplifier and drive servomechanism to control the hydraulic fluid release orifices size in both energy-absorbing release devices in inverse proportion to the amplitude of the combined electrical analog signals, to maximize release distance for any combination of passenger weight and vehicle velocity at crash impact. Current art includes many examples of fixed-release characteristic, non-recyclable energy-absorption instrumentation some of which would be amenable to making variable, using a servo control technique. A common energy-absorbing technique, in use today, employs the crushable honeycomb lattice structure material. Such could only be made variable in discrete steps of variable crushing characteristic. A stepper drive motor, for example, could be used to add or subtract parallel blocks of energy-absorbing crushable material as a function of the summation of scaled vehicle velocity and passenger weight analogs. Alternatively, more advanced methods amenable to making variable, use mechanical ablative techniques in which movable scraping fingers abrade varying depth grooves into a fixed metal or plastic plate.

Using an average maximum weight for all passengers, or alternatively, providing a manually-settable dial to select an actual weight by the passenger, a simpler but still effective alternative instrumentation is obtained by use of such fixed internal analog for weight. As shown in the release system block diagram of FIG. 11, using the electrical analog yielding from the setting of this maximum average weight selection, plus the electrical analog of the variable vehicle velocity fed to the release control electronics, for either a recyclable or non-recyclable energy-absorbing method, yields a very useful alternative for releasing, energy-absorbing function adjustment. Finally, the bandwidth of the release adjustment servomechanisms is held to less than 10 hertz to assure no change in release settings occur during the very brief crash impact interval.

What is claimed is:

1. For a passenger-carrying vehicle equipped with seats, a passenger restraint system comprising:
   a. a first dual shoulder belt retractor reel means that locks due to inertia, said reel means being one of mounted substantially behind a seat occupant under a roof of the vehicle or mounted on a rear of a seat back,
   b. a pair of shoulder belts arranged to pass over the shoulders and chest area of the seat occupant, each shoulder belt having a first end arranged to be reeled onto one spool of the first retractor reel means, each shoulder belt having a second end attached to a padded and body-conforming force-distributing and fastening plate,
   c. each of the pair of shoulder belts being padded and of variable width, gradually widening from just above the shoulder area to maximum width at an attachment point to the force-distributing and fastening plate,
   d. a two-part lap belt, each part having a first end attached to the lower end of one part of the fastening plate,and having a second end attached to one of a pair of floor attached, electrically-lockable second retractor reel means,
   e. a two-part snap connecting means, one each of the two parts attached to one part of the fastening plate to enable application of the two shoulder belts and lap belt by the seat occupant, said connecting means also actuating a switch to channel electrical power to both said lower electrically-lockable second retractor reel means, to effect retractor lockup,
   f. spring loading of the second reel means being greater than spring loading of the first reel means to urge the plates toward the second reel means so that the shoulder belts and lap belt are self-storing toward sides of a seat when the seat is not occupied.

2. The system of claim 1, further comprising,
   a. said first reel means having added releasing and energy-absorbing capability employing a device that absorbs energy and limits releasing of the belts in crashes, to permit the occupant's upper torso to move substantially forward in a crash into a complementary capturing and further energy-absorbing structure comprised of,
   b. a padded, face-conforming, horizontally-placed passenger capturing and restraining bar, automatically deployed in front of the occupant from an area of an instrument panel whenever the seat is occupied, and affixed to one or more support posts, said post or posts affixed to and driving into an energy-absorbing device, both energy absorbing devices 1) releasing maximally for an occupant of a maximum weight and maximum vehicle crash velocity, or both energy-absorbing devices 2) releasing maximally under a weight and velocity parameter electronic control for an occupant of a fixed maximum weight and instantaneous crash velocity, or both energy-absorbing devices 3) releasing maximally under weight and velocity parameter driven electronic control, for an occupant of any weight at any vehicle crash velocity, each of the maximal releases providing a release force characteristic to complement a deformation deceleration force characteristic of the vehicle, to result in an approximately linear deceleration of the occupant's upper torso during a crash.

3. The system of claim 1, further comprising, a. said first reel means having added releasing and energy-absorbing capability employing a device that absorbs energy and limits releasing of the belts in crashes, to permit the occupant's upper torso to move substantially forward in a crash into a telescoping, padded, deep-dish steering wheel and column assembly, the assembly captured by a device comprised of, b. a padded, concave face-conforming capturing and restraining bar, located under the steering wheel, and affixed to a support post arranged coaxially with the steering wheel column or affixed to two support posts located on either side of the steering wheel column, the post or posts driving into an energy-absorbing device, both energy-absorbing devices 1) releasing maximally for an occupant of a maximum weight and maximum vehicle crash velocity, or both energy-absorbing devices 2) releasing maximally under a weight and velocity parameter electronic control for an occupant of a fixed maximum weight and instantaneous crash velocity, or both energy-absorbing devices 3) releasing maximally under weight and velocity parameter driven electronic control, for an occupant of any weight at any vehicle crash velocity, each of the maximal releases providing a release force characteristic to complement a deformation deceleration force characteristic of the vehicle, to result in an approximately linear deceleration of the occupant's upper torso during a crash.

4. The system of claim 1, further comprising, a. said seat being a passenger seat, b. said first reel means having added releasing and energy-absorbing capability employing a device that absorbs energy and limits releasing of the belts in crashes, the energy-absorbing device 1) releasing maximally for an occupant of a maximum weight and maximum vehicle crash velocity, or both energy-absorbing devices 2) releasing maximally under a weight and velocity parameter electronic control for an occupant of a fixed maximum weight and instantaneous crash velocity, or both energy-absorbing devices 3) releasing maximally under weight and velocity parameter driven electronic control, for an occupant of any weight at any vehicle crash velocity, each of the maximal releases providing a release force characteristic to complement a deformation deceleration force characteristic of the vehicle, to result in an approximately linear deceleration of the occupant's upper torso during a crash.

5. The system of claim 1, further comprising, a. said first reel means having added releasing and energy-absorbing capability employing a device that absorbs energy and limits releasing of the belts in crashes, to permit the occupant's upper torso to move substantially forward in a crash into a telescoping, padded, deep-dish steering wheel and column assembly, the assembly captured by a device comprised of, b. the energy-absorbing device 1) releasing maximally for an occupant of a maximum weight and maximum vehicle crash velocity, or both energy-absorbing devices 2) releasing maximally under a weight and velocity parameter electronic control for an occupant of a fixed maximum weight and instantaneous crash velocity, or both energy-absorbing devices 3) releasing maximally under weight and velocity parameter driven electronic control, for an occupant of any weight at any vehicle crash velocity, each of the maximal releases providing a release force characteristic to complement a deformation deceleration force characteristic of the vehicle, to result in an approximately linear deceleration of the occupant's upper torso during a crash.

6. The system of claim 1, further comprising, a. said first reel means having added shoulder belt releasing and energy-absorbing capability employing a device that absorbs energy and limits releasing of the belts in crashes, to permit the occupant's upper torso to move substantially forward in a crash into a releasing, padded deep-dish steering wheel and column energy absorbing device, both energy absorbing devices 1) releasing maximally for an occupant of a maximum weight and maximum vehicle crash velocity, or both energy-absorbing devices 2) releasing maximally under a weight and velocity parameter electronic control for an occupant of a fixed maximum weight and instantaneous crash velocity, or both energy-absorbing devices 3) releasing maximally under weight and velocity parameter driven electronic control, for an occupant of any weight at any vehicle crash velocity, each of the maximal releases providing a release force characteristic to complement a deformation deceleration force characteristic of the vehicle, to result in an approximately linear deceleration of the occupant's upper torso during a crash.

7. The system of any one of claims 1–6, wherein the first retractor means comprises a semiautomatic restraint-systems applying or proffering augmentation, the augmentation comprising a lower lap belt proffering portion and an upper shoulder belt proffering portion, a. the first retractor means further comprising 1) a two-part assembly, each part including one shoulder belt reel retractor and retractor spring mounted on a shaft which extends outward from a side of a first part towards the second part, said shaft equipped to engage a reel shaft in the second part of the assembly, said reel shaft in the second part attached to an inertial-locking and releasing-energy-absorbing device serving the whole two-part assembly, each part also including a shoulder belt lifting arm and control mechanism, with said lifting arm and control mechanism adjustable in elevation and reach, the two-part assembly being positioned behind the seat occupant and attached via a shoulder belt reel-translator mechanism to a vehicle roof, providing an electromechanical drive means to enable the two parts of the assembly to either separate or close together, or 2) the first reel means being a one-part assembly with a pair of shoulder belt combination lifting and extending arms, each arm being capable of moving a shoulder belt guiding end in three dimensions to lift and separate and close together the shoulder belts, said moving including a correction for the extension required for any passenger position, the one-part assembly positioned substantially behind the seat occupant and attached directly to the roof of the vehicle or the one-part assembly attached to the back of a seat back, each arm void of a lifter span adjustment, c. a motor drive mechanism with a pull-actuated releasable drive clutch to drive the two parts of the lap belt from support tubes extending the second reel means,
d. and a central signal processing and control unit activated by ignition-on, door-closed, seat-occupancy, belts-buckled signals, and seat positioning information,
e. said control unit in a proffering phase lifting the shoulder belts up and placing over the outside edges of the seat occupant's shoulders, said motor drive mechanism in a proffering phase driving out the lap belt parts to place the fastening plates over outside edges of the seat occupant's hips for connecting of the fastening plates, said connecting causing closing of said translator mechanisms or relaxing of the lifting and extending arms,
f. said control unit in a monitor phase awaiting a belts-unbuckled signal, said control unit upon receipt of the belts-unbuckled signal commanding the translator mechanisms to separate the shoulder belts or raise the lifting and extending arms, whereupon after elapse of a preselected interval, said control unit monitors the ignition on signal, and if the ignition is on, monitors the door-closed and seat-occupancy signals.

* * * * *

UNITED STATES PATENT AND TRADEMARK OFFICE
CERTIFICATE OF CORRECTION

PATENT NO. : 6,293,588 B1
DATED : September 25, 2001
INVENTOR(S) : Elmer F. Clune It is certified that error appears in the above-identified patent and that said Letters Patent is hereby corrected as shown below:

<u>Column 5,</u>
Line 31, delete "halves or plate" insert -- or plate halves --

<u>Column 13,</u>
Line 60, delete "the assembly"
Line 61, delete "captured by a device comprised of,"

Signed and Sealed this

Fifth Day of November, 2002

Attest:

Attesting Officer

JAMES E. ROGAN
*Director of the United States Patent and Trademark Office*